United States Patent
Yoshida et al.

(10) Patent No.: US 6,480,308 B1
(45) Date of Patent: Nov. 12, 2002

(54) OPTICAL COMMUNICATION APPARATUS

(75) Inventors: Hideki Yoshida, Kanagawa (JP);
Youichi Toriumi, Tokyo (JP);
Kazuyoshi Horie, Tokyo (JP); Keniti Ookubo, Kanagawa (JP); Kuninori Shino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/323,866

(22) Filed: Jun. 1, 1999

(30) Foreign Application Priority Data

Jun. 10, 1998 (JP) .......................... 10-162205
May 7, 1999 (JP) .......................... 11-127604

(51) Int. Cl.[7] .............................................. H04B 10/08
(52) U.S. Cl. .................... 359/110; 359/161; 359/173; 359/166; 359/143; 370/241; 455/69
(58) Field of Search ................... 359/110, 173, 359/166, 177, 153, 187, 143, 161, 152; 370/241; 455/69

(56) References Cited

U.S. PATENT DOCUMENTS

| 4,553,268 | A | | 11/1985 | Tilly | 455/607 |
|---|---|---|---|---|---|
| 5,485,300 | A | | 1/1996 | Daley | 359/180 |
| 5,623,355 | A | * | 4/1997 | Olsen | 359/110 |
| 5,677,779 | A | * | 10/1997 | Oda et al. | 359/152 |
| 5,706,112 | A | | 1/1998 | Morita et al. | 359/142 |
| 5,801,860 | A | | 9/1998 | Yoneyama | 359/124 |
| 5,822,099 | A | | 10/1998 | Takamatsu | 359/153 |
| 5,854,702 | A | * | 12/1998 | Ishikawa et al. | 359/152 |
| 6,246,499 | B1 | * | 6/2001 | Kunito et al. | 359/161 |

FOREIGN PATENT DOCUMENTS

| GB | 2 219 165 A | 11/1989 | H04B/9/00 |
|---|---|---|---|

OTHER PUBLICATIONS

Patent Abstracts of Japan, vol. 10, No. 343, Apr. 19, 1989, JP 01 101035 (Hitachi Ltd.).
Patent Abstracts of Japan, vol. 10, No. 158, Jan. 20, 1986, JP 61 012138, (Nippon Denki KK).
Application No. 08/890,626, filed Jul. 9, 1997.

* cited by examiner

Primary Examiner—Leslie Pascal
Assistant Examiner—Hanh Phan
(74) Attorney, Agent, or Firm—Sonnenschein, Nath & Rosenthal

(57) ABSTRACT

The invention provides an optical communication apparatus to communicate a data signal. The optical communication apparatus is capable of firmly carrying out optical communication using an optical transmission media. The optical transmission media may be connected between a first optical communication apparatus and a second optical communication apparatus. Upon a detector detecting an incoincidence between an electric signal outputted from a light receiving element and a test signal, a controller may control a parameter of a light emitting power control signal to increase an intensity of an optical signal outputted from a light emitting element. Upon the detector detecting a coincidence therebetween, the controller may set a current value of a parameter of the light emitting power control signal as a parameter upon a selector selecting the data signal.

11 Claims, 8 Drawing Sheets

OPTICAL COMMUNICATION APPARATUS

BACKGROUND OF THE INVENTION

1. Field of the Invention

The present invention relates to an optical communication apparatus.

2. Description of the Related Art

FIG. 8 is a block diagram for explaining an example of the constitution of a conventional optical communication apparatus. There is a diode (hereinafter, abbreviated as LD) 1 which converts an electric signal into laser beam having a corresponding intensity and transmits the laser beam to outside via an optical fiber, not illustrated. An LD driving unit 2 drives LD 1 in accordance with transmission data (Tx. Data) inputted via a signal line 3 and an output signal 7 from APC (Auto Power Control) 5. A portion of the laser beam emitted from LD 1 is incident on a photodiode 4 and the photodiode 4 converts the incident laser beam into an electric signal.

APC 5 controls the LD driving unit 2 in accordance with the electric signal outputted from the photodiode 4 and a reference amplitude (Tx. Ref) of a transmission signal inputted from a signal line 6 such that the intensity of the laser beam emitted from LD 1 becomes a predetermined amplitude. Laser beam transmitted via an optical fiber, not illustrated, is incident on a photodiode 8 and the photodiode 8 converts the laser beam into a corresponding electric signal. An amplifying unit 9 amplifies the electric signal outputted from the photodiode 8 by a predetermined gain and outputs the electric signal to an inner portion of the optical communication apparatus as reception data (Rx. Data) via a signal line 10.

The transmission data is supplied to the LD driving unit 2 via the signal line 3. The LD driving unit 2 drives LD 1 to emit laser beam in accordance with the transmission data and the output signal 7 from APC 5. The laser beam emitted from LD 1 is transmitted to other party of communication, not illustrated, via an optical fiber, not illustrated.

The portion of the laser beam emitted from LD 1 is incident on the photodiode 4 and accordingly, an electric signal in correspondence with the intensity of the laser beam emitted from LD 1 is inputted to APC 5. APC 5 compares the electric signal outputted from the photodiode 4 with the reference amplitude (Tx. Ref) of the transmission signal inputted from the signal line 6 and controls the LD driving unit 2 such that both maintain a predetermined relationship (for example, such that both are equal to each other). As a result, the intensity of the laser beam emitted from LD 1 always becomes a predetermined amplitude.

Further, the laser beam transmitted via an optical fiber, not illustrated, is photoelectrically converted into the corresponding electric signal by the photodiode 8, amplified by the amplifying unit 9 by a predetermined gain and thereafter is outputted to the inner portion of the optical communication apparatus as reception data via the signal line 10.

According to the above-described conventional optical communication apparatus, the intensity of the transmitted laser beam is always set to be a predetermined amplitude. It is general that the intensity of the laser beam is set with transmission loss of a longest optical fiber as a reference in a system thereof (a system constituted by connecting optical communication apparatus to each other).

When a power value of laser beam is set to an intensity capable of sufficiently dealing with transmission loss in an optical fiber having a longest length in a system, the system can ensure a sufficient intensity (power value).

It is said that the life of a laser diode (LD) is inversely proportional to the second through the third power of an intensity of emitted laser beam. Therefore, in the case in which an intensity of laser beam which can communicate through an optical fiber having a longest length which is predicted in using the optical fiber in a system when communication is carried out by an optical fiber having a short length, the intensity becomes excessively heavy and the life of LD is significantly shortened.

That is, in the case in which the intensity of laser beam which can communicate through the optical fiber having the long length which is predicted in using the optical fiber in a system, when lengths of optical fibers used differ from each other significantly, the intensity of laser beam inputted to a reception unit of an optical communication apparatus similarly differs significantly. For example, in the case of LAN (Local Area Network) or the like, the length of an optical fiber used is varied significantly substantially from 1 m through 2 km and accordingly, a difference in transmission losses becomes about 16 dB and the intensity of laser beam is varied significantly in accordance therewith. Such a difference is particularly significant in POF (Plastic Optical Fiber) having large transmission loss.

When the intensity of inputted laser beam differs significantly in this manner, in order to ensure an error rate at a constant value or lower in respect of input of laser beam in any intensity, the dynamic range of light in an optical communication apparatus needs to provide sufficiently widely, as a result, there poses a problem in which design of the apparatus becomes complicated and fabrication cost of the apparatus is increased.

Further, when the problem of Eye Safe is considered, it is preferable to set the intensity of laser beam as small as possible. When the intensity of laser beam is set low, in a system having significant loss (for example, a system connected by POF or the like), there poses also a problem in which the design becomes difficult owing to the problem of the dynamic range as mentioned above.

A conventional optical communication apparatus is not constituted such that control of light emitting power and reception sensitivity is dynamically carried out in accordance with a kind, a length, a situation of laying thereof, a condition of using thereof or the like of an optical fiber used. Therefore, the optical communication apparatus including the optical fiber needs to fabricate under a severe specification conscious of the worst condition, as a result, the apparatus becomes expensive. This is significant particularly in the case of using an optical transmission medium having comparatively large transmission loss such as an optical fiber made of plastic.

Therefore, the present invention relates to an optical communication apparatus resolving the above-described problem and capable of firmly executing optical communication using an optical transmission medium among optical communication apparatus under an optimum condition.

SUMMARY OF THE INVENTION

Hence, according to a first aspect of the present invention, there is provided an optical communication apparatus connected to an optical communication apparatus on other party side via an optical transmission medium for communicating a data signal with the optical communication apparatus on the other party side, the optical communication apparatus comprising drive signal outputting means for controlling a signal level of an input signal in accordance with a light emitting power control signal and outputting the input signal the signal level of which has been controlled as a drive signal, a light emitting element for emitting light at an intensity in accordance with the signal level of the drive signal and transmitting an optical signal via the optical transmission medium, test signal generating means for forming a test signal having a specific signal pattern, selecting means for selectively outputting either of the test signal and the data signal to the drive signal forming means as the input signal, a light receiving element for receiving the optical signal via the optical transmission medium and converting the received optical signal into an electric signal, detecting means for detecting whether the electric signal outputted from the light receiving element coincides with the specific signal pattern when the selecting means selects the test signal and controlling means for controlling a parameter of the light emitting power control signal based on a result of detection by the detecting means, wherein when the detecting means detects that the electric signal does not coincide with the specific signal pattern, the controlling means controls the parameter of the light emitting power control signal such that an intensity of the optical signal outputted by the light emitting element is increased and when the detecting means detects that the electric signal coincides with the specific signal pattern, the controlling means sets a current value of the parameter of the light emitting power control signal as the parameter when the selecting means selects the data signal.

According to the first aspect of the invention, when the detecting means detects that the electric signal does not coincide with the specific signal pattern, the controlling means controls the parameter of the light emitting power control signal such that the intensity of the optical signal outputted by the light emitting element is increased and when the detecting means detects that the detected signal coincides with the specific signal pattern, the controlling means sets the current value of the parameter of the light emitting power control signal as the parameter when the selecting means selects the data signal. Thereby, the intensity of the optical signal is sets to be small initially. When the intensity of the optical signal is increased by controlling the parameter of the light emitting power control signal and the coincidence of the result of detection is established, the controlling means sets the parameter of the light emitting power control signal as the parameter when the selecting means selects the data signal. Accordingly, optical communication among the optical communication apparatus is firmly carried out by reducing transmission loss in optical transmission under an optimum condition in accordance with the length of the optical transmission media.

According to a second aspect of the invention, there is provided the optical communication apparatus according to the first aspect wherein the specific signal pattern of the test signal formed by the test signal generating means is previously set to be different from a signal pattern of a test signal outputted from the optical communication apparatus on the other party side, the selecting means comprises a first selector for selectively outputting either of the test signal formed by the test signal generating means and the electric signal outputted from the light receiving element, and a second selector for selectively outputting either of an output from the first selector and the data signal, wherein the controlling means controls the selecting means such that when the test signal having the signal pattern different from the specific signal pattern is detected, the first selector outputs the electric signal and the second selector outputs the electric signal which is the output from the first selector.

According to the second aspect of the invention, in the operation of the controlling means, when the test signal having the signal pattern different from the specific signal pattern is detected, the first selector can output the electric signal and the second selector can output the electric signal which is the output from the first selector.

According to a third aspect of the invention, there is provided the optical communication apparatus according to the first aspect, further comprising an intensity detecting light receiving element for detecting the intensity of the optical signal transmitted from the light emitting element, wherein the controlling means stops controlling the parameter which is carried out when the detecting means detects that the electric signal does not coincide with the specific signal pattern in a case in which the intensity of the optical signal detected by the intensity detecting light receiving element becomes a limit value or more.

According to the third aspect of the invention, in the operation of the controlling means, when the intensity of the optical signal detected by the intensity detecting light receiving element becomes equal to or more than the limit value, the operation can be stopped by stopping to control the parameter which is carried out when the detecting means detects the incoincidence and the optical communication can be prevented from being carried out at the intensity of the optical signal which is equal to or more than the limit value.

According to a fourth aspect of the invention, there is provided the optical communication apparatus according to the third aspect, further comprising storing means for storing the limit value of the light emitting element for emitting light, wherein the controlling means stop controlling the parameter when the intensity of the optical signal detected by the intensity detecting light receiving element is equal to the limit value.

According to the fourth aspect of the invention, the controlling means can stop controlling the parameter when the intensity of the optical signal detected by the intensity detecting light receiving element becomes equal to the limit value.

According to a fifth aspect of the invention, there is provided the optical communication apparatus according to the first aspect wherein the controlling means controls the selecting means such that the data signal is outputted after the parameter of the light emitting power control signal has been set.

According to a sixth aspect of the invention, there is provided the optical communication apparatus according to the first aspect, further comprising time measuring means for measuring a time period from a timing when the light emitting element transmits the test signal.

According the sixth aspect of the invention, there can be known the time period from the timing at which the test signal has been transmitted in accordance with the time period measured by the time measuring means.

According to a seventh aspect of the invention, there is provided the optical communication apparatus according to the sixth aspect, further comprising informing means for informing an abnormality to a user based on a signal indicating the abnormality outputted by the controlling means, wherein the informing means informs a user of the abnormality by outputting the signal indicating the abnormality when the controlling means has not set the parameter of the light emitting power control signal until the time measuring means has counted the predetermined time period from the timing when the light emitting element transmitted the test signal.

According to the seventh aspect of the invention, the informing means can inform a user of the abnormality by the signal indicating the abnormality.

According to an eighth aspect of the invention, there is provided the optical communication apparatus according to the first aspect, further comprising amplifying means connected between the light receiving element and the detecting means for amplifying the electric signal converted by the light receiving element based on a predetermined gain and outputting the amplified electric signal to the detecting means.

According to the eighth aspect of the invention, the amplified electric signal can firmly be provided to the. detecting means.

According to a ninth aspect of the invention, there is provided the optical communication apparatus according to the eighth aspect wherein the amplifying means comprises an analog/digital converting unit for analog/digital-converting the electric signal.

According to a tenth aspect of the invention, there is provided the optical communication apparatus according to the eighth aspect wherein the controlling means controls the gain based on the result of detection of the detecting means.

According to the tenth aspect of the invention, the gain in amplifying the electric signal of the light receiving element can be controlled optimally in accordance with the result of detection.

According to an eleventh aspect of the invention, there is provided the optical communication apparatus according to the first aspect wherein the test signal is a signal having a specific rule which is not provided to the data signal.

According to the eleventh aspect of the invention, the test signal can clearly be discriminated from the data signal.

DETAILED DESCRIPTION OF THE PREFERRED EMBODIMENTS

A detailed explanation will be given of preferred embodiments according to the present invention in reference to the attached drawings as follows.

Further, although embodiments described below are preferable specific examples of the present invention and therefore, various technically preferable limitations are provided thereto, the scope of the present invention is not limited to these embodiments so far as there is no particular description of limiting the present invention in the following explanation.

Figure 1:
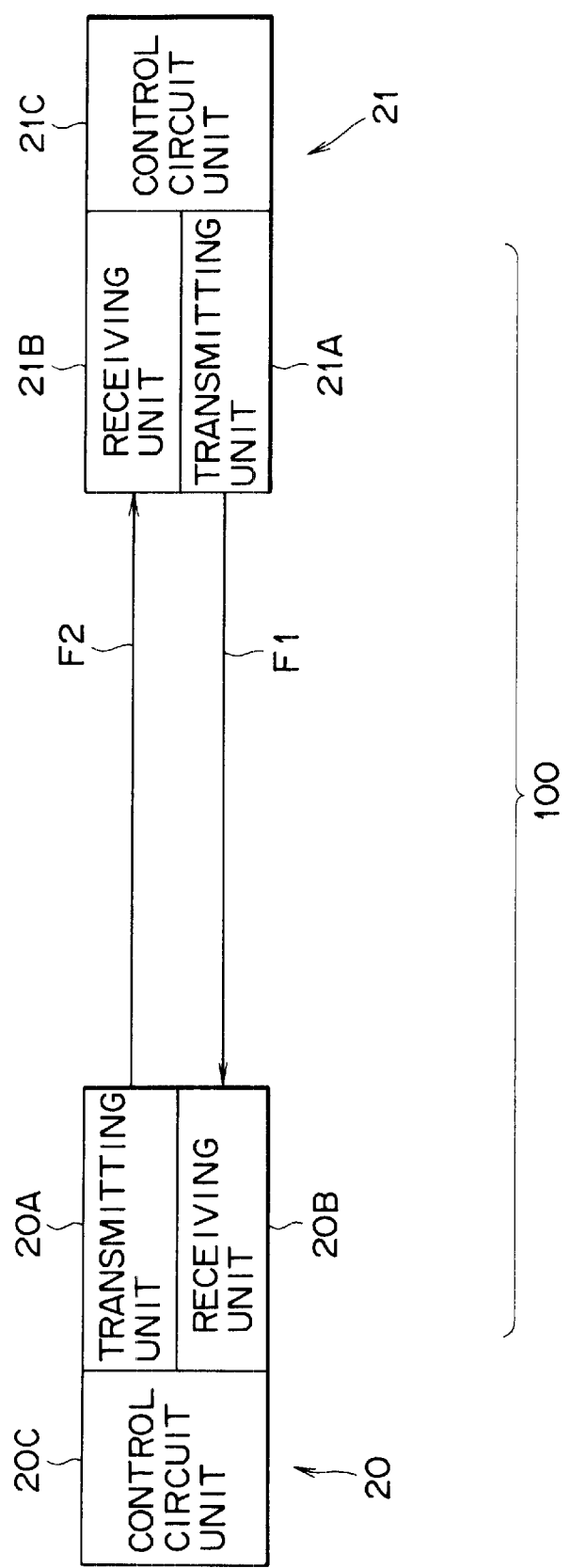
FIG. 1 is a diagram showing a preferred embodiment of a communication system according to the present invention.

FIG. 1 shows a preferred embodiment of a communication system according to the present invention. The communication system 100 constitutes an optical communication system by being provided with, for example, a first optical communication apparatus 20 and a second optical communication apparatus 21. Optical fibers (optical transmission media) F1 and F2 are arranged between the first optical communication apparatus 20 and the second optical communication apparatus 21.

The first optical communication apparatus 20 and the second optical communication apparatus 21 are provided with the same constitution. The first optical communication apparatus 20 is provided with a transmitting unit 20A, a receiving unit 20B and a control unit 20C. The second optical communication apparatus 21 is provided with a transmitting unit 21A, a receiving unit 21B and a control unit 21C. The transmitting units 20A and 21A are the same as each other, the receiving units 20B and 21B are the same as each other and the control units 20C and 21C of a digital type are the same as each other.

The transmitting units 20A and 21A modulate optical signals in accordance with information intended to transmit and transmit the optical signals to the receiving units 21B and 20B on the other parties via the optical fibers F2 and F1.

The control units 20C and 21C adjust intensities (power values) of the optical signals outputted from the transmitting units 20A and 21A in reference to whether the optical signals received by the receiving units 20B and 21B are normal.

Figure 2:
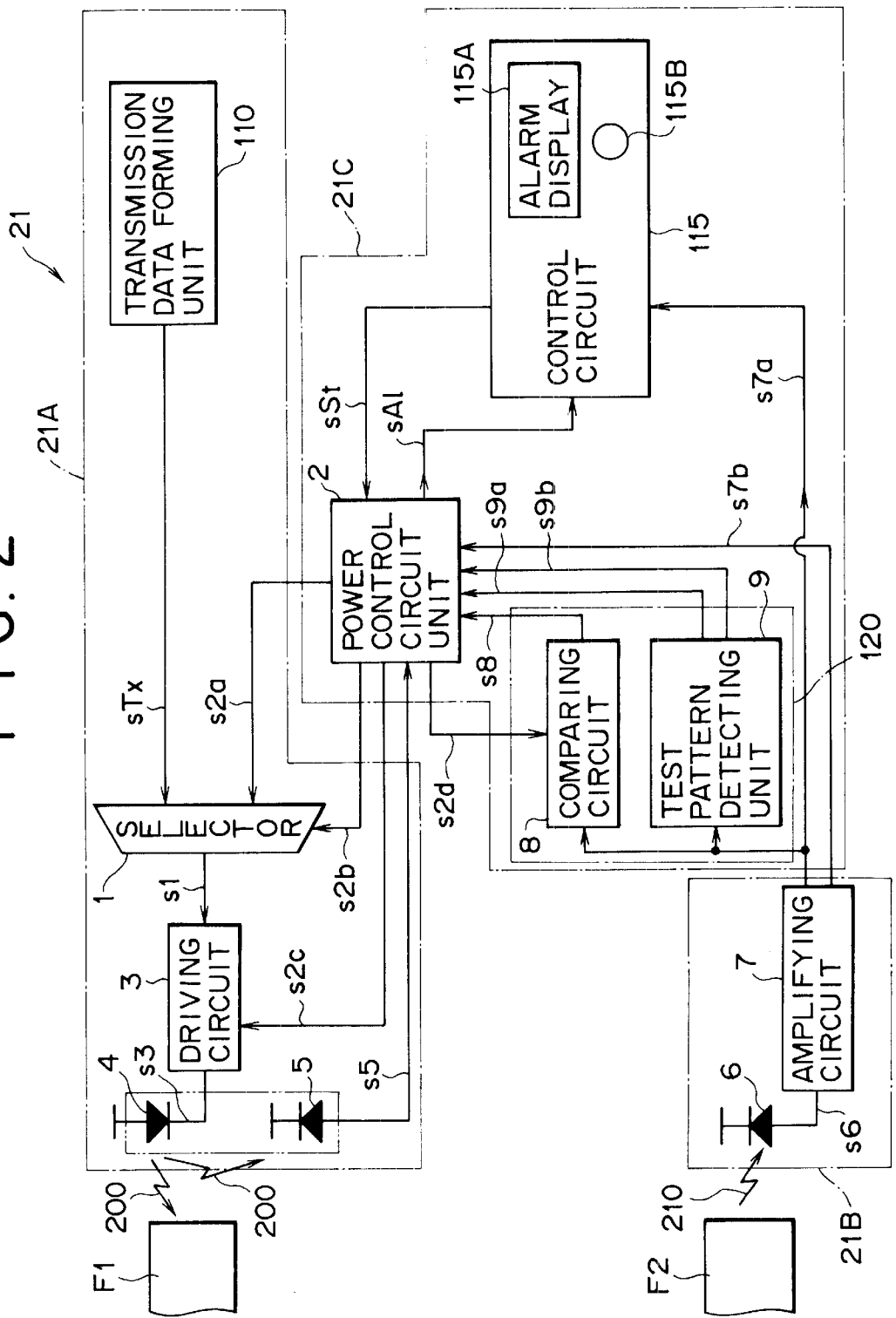
FIG. 2 is a diagram showing an example of the structure of an optical communication apparatus of the communication system shown by FIG. 1.

FIG. 2 shows a structure of the second optical communication apparatus 21 as a representative of the first optical communication apparatus 20 and the second optical communication apparatus 21 shown by FIG. 1. The first optical communication apparatus 20 is provided with the same structure and accordingly, an explanation will be given of the structure and the operation of the second optical communication apparatus 21 to thereby substitute for an explanation of the structure and the operation of the first optical communication apparatus 20.

As described above, the optical communication apparatus 21 is provided with the transmitting unit 21A, the receiving unit 21B and the control unit 21C.

For the optical fibers F1 and F2, for example, optical fibers made of plastic or optical fibers made of glass can be used. The optical fibers F1 and F2 can respectively be connected attachably and detachably to and from a connector portion of the transmitting unit 21A and a connector portion of the receiving unit 21B.

The transmitting unit 21A is provided with a light emitting element 4 and a monitor light receiving element 5, a driving circuit 3, a selector 1 and a transmission data forming unit 110. As the light emitting element 4, for example, a laser diode or a light emitting diode (LED) or the like can be adopted. The monitor light receiving element 5 is an intensity detecting light receiving element for detecting an intensity of an optical signal transmitted by the light emitting element 4 and for the monitor light receiving element 5, for example, a photodiode can be adopted.

The driving circuit 3 controls a signal level of an input signal s1 from the selector 1 in accordance with a light emitting power value control signal s2c and outputs the input signal s1 the signal level of which has been controlled, as a drive signal s3 to the light emitting element 4.

The light emitting element 4 is driven by the driving circuit 4 to emit an optical signal 200 to an end portion of the optical fiber F1. The optical signal 200 emitted by the light emitting element 4 is received by the monitor light receiving element 5 for monitoring.

The selector 1 is selecting means for selecting either of transmission data sTx from the transmission data forming unit 110 and a test signal input s2a from a power control circuit unit 2 and transmitting the input signal s1 to the driving circuit 3.

The receiving unit 21B is provided with a light receiving element 6 and an amplifying circuit 7. For the light receiving element 6, for example, a photodiode or the like can be adopted and the light receiving element 6 receives and photoelectrically converts an optical signal 210 emitted from an end portion of the optical fiber F2 and transmits a current signal s6 to the amplifying circuit 7.

The optical signal 210 is outputted from the transmitting unit 20A of the first optical communication apparatus 20 and transmitted via the optical fiber F2 or the optical signal 210 is generated from the transmitting unit 21A of the second optical communication apparatus 21 and transmitted via the optical fiber F1, the first optical communication apparatus 20 and the optical fiber F2.

The amplifying circuit 7 amplifies and analog/digital-converts the current signal s6 and produces a reception signal s7a and a detection signal s7b. The reception signal s7a is transmitted to a control circuit 115, a comparing circuit 8 and a test pattern detecting circuit 9. The reception signal s7a is a communication signal (data signal) received by the light receiving element 6. The detection signal s7b is transmitted to the power control circuit unit 2. The detection signal s7b is a signal for detecting whether the received optical signal 210 is outputted with a constant amplitude or more and is a signal for detecting, for example, whether the optical fiber F2 is normally connected or whether the first optical communication apparatus 20 is operated normally.

Next, an explanation will be given of the control circuit unit 21C. The control circuit unit 21C is provided with the power control circuit unit 2, the comparing circuit 8, the test pattern detecting circuit 9 and the control circuit 115. The detection signal s7b is a signal limiting (restricting output of) the driving circuit 3 and notified to the control circuit 115. The comparing circuit 8 transmits to the power control circuit unit 2, a signal s8 which is a result of comparing signal patterns of a test signal s2d generated by the power control circuit unit 2 and the reception signal s7a generated by the amplifying circuit 7.

The test pattern detecting circuit 9 transmits a test pattern signal s9a and transmits a test data output signal s9b to the power control circuit unit 2. The test pattern signal s9a is a signal in correspondence with the reception signal s7a outputted by the amplifying circuit 7 for notifying a test pattern signal transmitted by the first communication apparatus 20 on the other party side to the power control circuit unit 2. The test data output signal s9b is a signal for detecting whether a signal is the test pattern signal or a data signal. The test pattern detecting circuit 9 and the comparing circuit 8 detect whether the electric signal outputted from the light receiving element 6 is a test signal having a specific signal pattern when the selector 1 selects the test pattern signal (test signal).

As a method by which the test pattern detecting circuit 9 recognizes the test pattern, the test pattern can be discriminated by using a code which is not allocated to normal data other than the test pattern in, for example, nBmB conversion or the like which is a generally used encoding method. According to the nBmB conversion, for example, in the case of 8B10B, a code conversion is carried out such that 8 bits are converted into 10 bits and the nBmB conversion can be used as a code for forming the test pattern. When normal data comprises 8 bits, that is, is represented by 256 ways, by carrying out, for example, 8B10B, a remainder produced by subtracting 256 ways from 1024 ways can be used for the test pattern. Among them, the test pattern signal is provided with a pattern in which, for example, higher order 4 bits are constituted by numerals 1, that is, 1111xxxxxxxx and the data signal is not provided with the above-described pattern by which the test pattern detecting circuit 9 can recognize the test pattern.

The control circuit 115 is provided with a display unit 115A and an alarm sound generating unit 115B and the display unit 115A and the alarm sound generating unit 115B inform abnormality of the test signal to a user. The control circuit 115 transmits a start signal sSt and the power control circuit unit 2 transmits an alarm signal sA1 to the control circuit 115 when the optical communication is failed or the like. The control circuit unit 21C is provided with the power control circuit unit 2, mentioned above, and the power control circuit unit 2 transmits the test signal input s2a and a selector signal s2b to the selector 1. The power control circuit unit 2 transmits a light emitting power value control signal s2c to the driving circuit 3. The monitor light receiving element 5 transmits a detection output s5 to the power control circuit unit 2. The power control circuit unit 2 transmits the test signal s2d to the comparing circuit 8.

Figure 3:
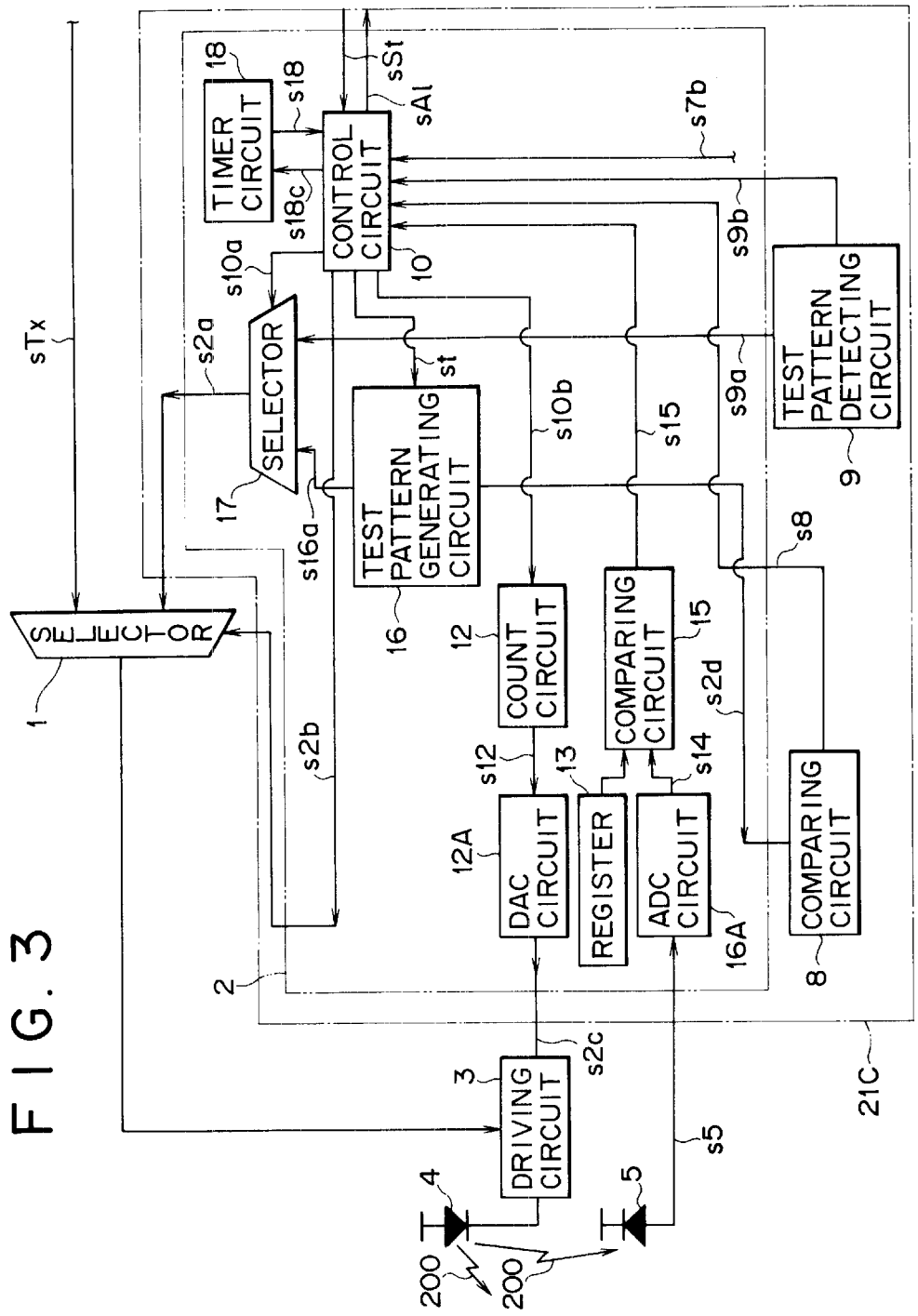
FIG. 3 is a diagram showing the structure of a power control circuit unit of the optical communication apparatus shown by FIG. 2 and a peripheral portion thereof.

FIG. 3 shows a detailed constitution of the power control circuit unit 2 shown by FIG. 2 and its peripheral portions.

The power control circuit unit 2 is provided with a timer circuit 18, a selector 17, a control circuit 10, a test pattern generating circuit 16, a count circuit 12, a DAC circuit 12A, a register 13, an ADC circuit 16A and a comparing circuit 15.

When the start signal sSt from the control circuit 115 is received by the control circuit 10, the control circuit 10 transmits a count start signal s18C to the timer circuit 18 by which the timer circuit 18 starts counting.

The timer circuit 18 transmits a time out signal s18 to the control circuit 10 at a time point where a predetermined time period has been counted. The selector 17 receives a selecting signals s10a from the control circuit 10, the test pattern signal (detection output) s9a and a test pattern signal s16a. The selector 17 selects either of the test pattern signal s9a and the test pattern signal s16a in accordance with the selecting signal s10a and transmits the test signal input s2a shown by FIG. 2 to the selector 1.

The selector 17 of FIG. 3 constitutes a first selector for selectively outputting either of the test pattern signal (test signal) and the electric signal outputted from the light receiving element.

The test pattern signal s9a is a signal for transmitting back to the first optical communication apparatus 20, the test signal transmitted by the opposed first communication apparatus 20 for determining light emitting power and is detected by the test pattern detecting circuit 9. When the test pattern transmitted by the opposed optical communication apparatus is detected, or by the signal s8 from the comparing circuit 8 and the test data output signal s9b, that is, when the signal s8 of the comparing circuit 8 is not the test pattern signal transmitted by the second optical communication apparatus 21 and the test pattern detecting circuit 9 detects the test pattern signal, the test pattern signal s9a is transmitted to the driving circuit 3 via the selector 1.

The test pattern signal s16a is outputted from the test pattern generating circuit 16 and is transmitted to the opposed first optical communication apparatus 20 via the selector 17 and via the selector 1. The test pattern signal s16a is a test signal having a specific signal pattern.

The control circuit 10 supplies a power up signal s10b to the count circuit 12. The count circuit 12 counts the power up signal s10b and transmits it to the DAC circuit (digital/analog conversion circuit) 12A as a count output s12. The DAC circuit 12A converts the count output s12 into an analog signal and transmits the power control signal s2c of the driving circuit to the driving circuit 3. Thereby, the driving circuit 3 can control the power value of the optical signal 200 of the light emitting element 4.

The control circuit 10 of FIG. 3 controls a total of the power control circuit unit 2. The timer circuit 18 outputs the time out signal s18 to the control circuit 10 when a predetermined time period has elapsed after transmitting the test signal. When the control circuit 10 is not inputted with the detection signal s8 for detecting the test signal before the timer circuit 18 has counted the predetermined time period, the control circuit 10 outputs the power up signal s10b to the count circuit 12 to thereby output the count output s12 to the DAC circuit 11. The DAC circuit 11 digital/analog-converts the count output s12 and outputs the analog signal as the power control signal s2c for the driving circuit.

The register 13 of FIG. 3 is a memory (storing means) for storing at least one, preferably, a plurality of stages of previously determined power values of the optical signal 200. The ADC circuit (analog/digital-conversion circuit) 16A receives and analog/digital-converts the detection output s5 from the monitor light receiving element 5 and transmits an output s14 to the comparing circuit 15.

The comparing circuit 15 compares the plurality of stages of power values of the optical signal 200 stored in the register 13 with the output s14 in correspondence with the detection output from the monitor light receiving element 5 to thereby detect what degree of the power value is the detection output s5 received by the monitor light receiving element 5 and the comparing circuit 15 can transmit a comparison result signal s15 to the control circuit 10.

The test pattern generating circuit 16 receives a timing signal st from the control circuit 10 and can transmit the test pattern signal s16a to the selector 17 in accordance with the timing signal st.

Next, an explanation will be given of an example of controlling operation in optical transmission when using the first optical communication apparatus 20 and the second optical communication apparatus 21 as well as the optical fibers F1 and F2 of the communication system 100, mentioned above.

In normal optical communication operation, the power control circuit unit 2 of FIG. 2 transmits the selector signal s2b to the selector 1 by which the selector 1 is switched to the side of the transmission data sTx intended to transmit.

Thereby, the transmission data sTx formed by the transmission data forming unit 110 is selected by the selector 1 as the input signal s1 and the input signal s1 is supplied to the driving circuit 3. The driving circuit 3 operates the light emitting element 4 based on the input signal s1 and the light emitting element 4 transmits the optical signal 200 to an end portion of the optical fiber F1 in accordance with the transmission data sTx.

The optical signal 210 transmitted from the first communication apparatus 20 shown by FIG. 1 on the other party side via the optical fiber F2 is received by the light receiving element 6 to thereby input the current signal s6 to the amplifying circuit 7. The amplifying circuit 7 amplifies the current signal s6 and outputs the reception signal s7a and the detection signal s7b.

Next, an explanation will be given of an example of setting an optimum power value of an optical signal in accordance with, for example, transmission path lengths of the optical fibers F1 and F2 and characteristics of the first optical communication apparatus 20 and the second optical communication apparatus 21 by actually controlling the power value of the optical signal 200 of the light emitting element 4.

The power control circuit unit 2 of FIG. 2 starts operation by receiving the start signal sSt from the control circuit 115. In the normal case, the operation of the power control circuit unit 2 is started when a main power supply is made ON and connectors of the optical fiber F1 and the optical fiber F2 are connected to respectively corresponding positions.

In this case, there is a method of confirming connection of the connector of the optical fiber as follows.

When the second optical communication apparatus 21 supplies the optical signal 200 to the first optical communication apparatus 20 on the other party side via the optical fiber F1 and the optical signal 210 is received by the light receiving element 6 from the first optical communication apparatus 20 via the optical fiber F2, the detection signal s7b of FIG. 2 is transmitted to the power control circuit unit 2 in the case where the received optical signal 210 is provided with an output of a predetermined amplitude or more.

Figure 5A:
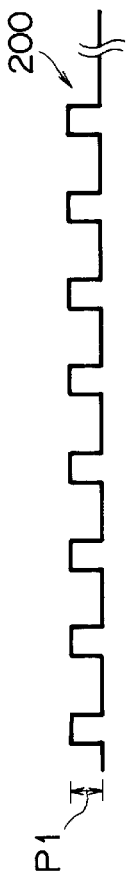
FIGS. 5A, 5B, 5C, 5D and 5E are diagrams showing an example in which a control signal of a light emitting power value is set in multiple stages when an optical signal is emitted from a light emitting element.
Figure 5B:
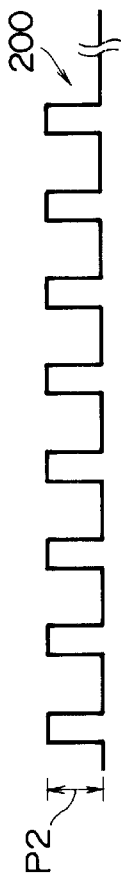
Figure 5C:
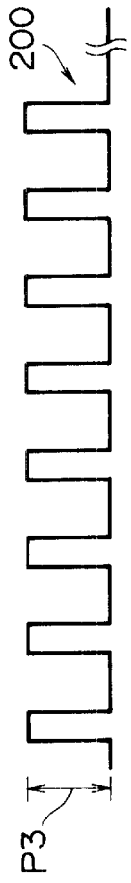
Figure 5D:
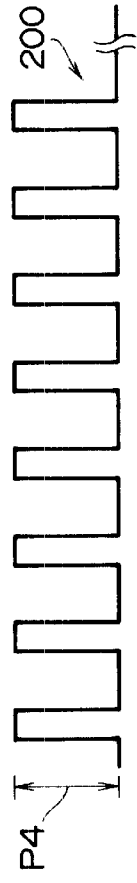
Figure 5E:
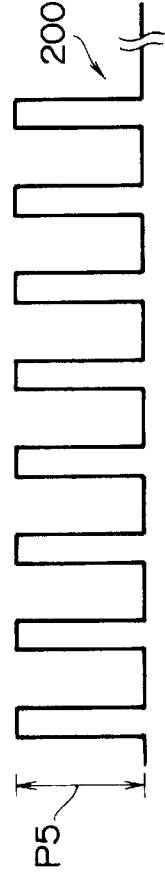

In this case, when the second optical communication apparatus 2 transmits, for example, a signal shown by FIG. 5C as the light emitting power value control signal s2c of the optical signal 200 from the power control circuit unit 2 to the driving circuit 3, the power control circuit unit 2 determines that the optical fibers F1 and F2 are firmly connected to the connector portions in the case where the detection signal s7b is outputted. In this way, when the power value of the optical signal 210 becomes larger than a certain level, the connection of the optical fibers is confirmed and the operation of power control is started.

Firstly, the power control circuit unit 2 outputs the test signal input s2a to the selector 1. Further, the power control circuit unit 2 controls to output the select signal s2b and to have the selector 1 select the test signal input s2a. Further, the power control circuit unit 2 outputs the power control signal s2c to the driving circuit 3 such that the light emitting element 4 emits light with a minimum light emitting power and the driving circuit 3 drives the signal s1 outputted from the selector 1 by a power indicated by the power control signal s2c. In this case, the test signal s2a is supplied as the output signal s1 of the selector 1. Further, the light emitting element 4 emits light based on the drive signal s3 outputted from the driving circuit 3 and outputs the optical signal 200 to the first optical communication apparatus 20 via the optical fiber F1.

When the optical signal 200 is received by the opposed first optical communication apparatus 20 shown by FIG. 1, the received optical signal 200 returns to the light receiving element 6 as it is via the optical fiber F2 as the optical signal 210 in FIG. 2. When the light receiving element 6 receives the optical signal 210, the reception signal s7a is compared with the test signal s2d (a signal the same as the test signal s2a) by the comparing circuit 8 and when both are provided with the same signal pattern, the reception is regarded as normal and the current power value for the light emitting element is maintained. That is, while maintaining the value of the light emitting power value control signal s2c transmitted from the power control circuit unit 2 to the driving circuit 3, the selector 1 selects the transmission data sTx outputted by the transmission data forming unit 110 and there is brought about normal optical communication operation using the actual optical communication apparatus 20 and 21 and the optical fibers F1 and F2.

Figure 4:
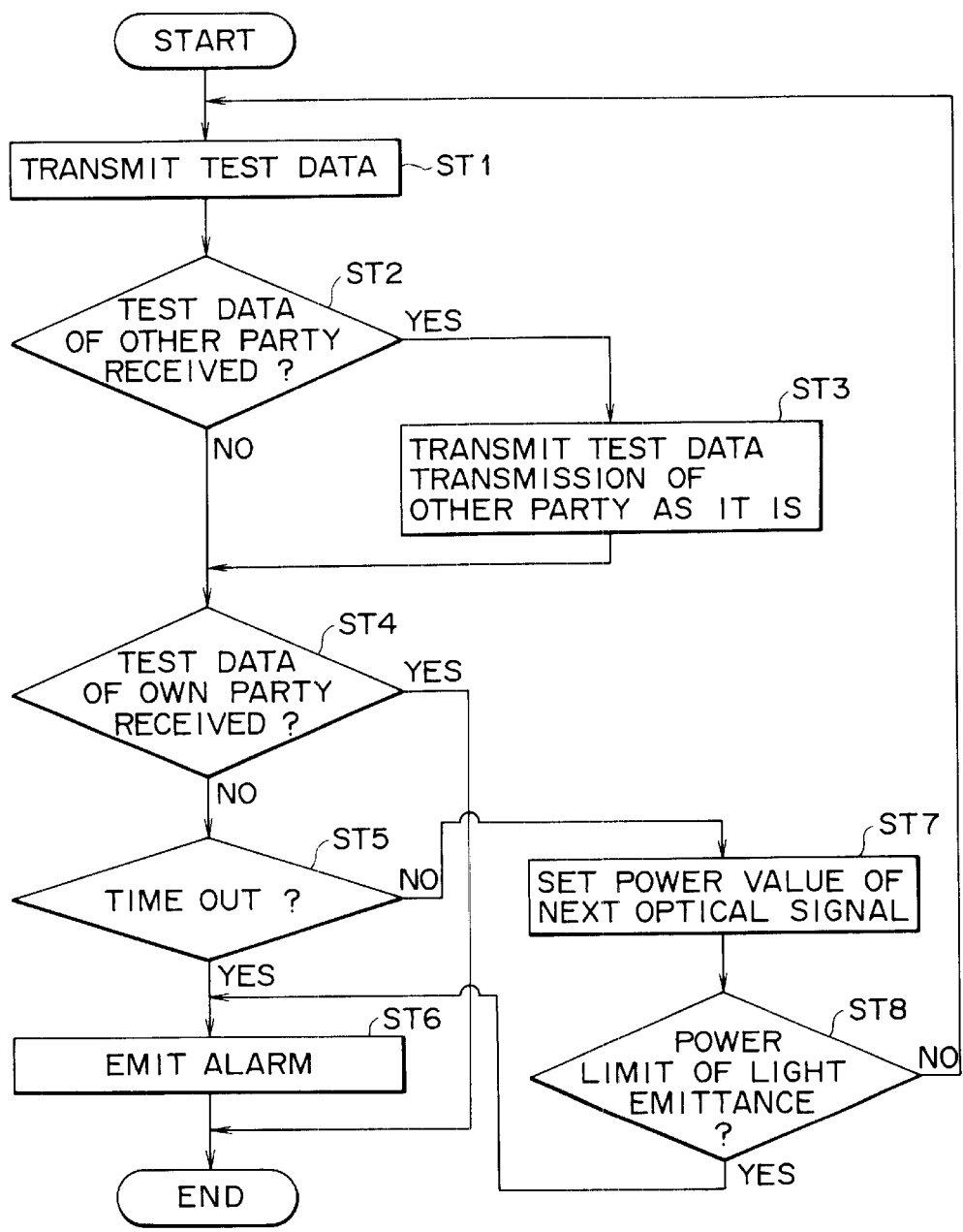
FIG. 4 is a diagram showing an example of operation.

This behavior is shown by step ST1, step ST2 and step ST4 of FIG. 4.

At step ST1 of FIG. 4, the main power supply is turned on and test data is transmitted from the first optical communication apparatus 20 to the second optical communication apparatus 21. At step ST2, when the second optical communication apparatus 21 receives test data from the first optical communication apparatus 20, at step ST3, the test data is transmitted as it is from the second optical communication apparatus 21 to the first optical communication apparatus 20 via the optical fiber F1.

Thereby, the light emitting element 4 of the second optical communication apparatus 21 can inform reception of the optical signal 210 of the test data emitted by the first optical communication apparatus 20 to the first optical communication apparatus 20 on the other party side via the optical fiber F1.

Meanwhile, when the second optical communication apparatus 21 transmits the optical signal 200 in correspondence with the test signal input s2a to the first optical communication apparatus 20 on the other party side as indicated by step ST1, step ST2 and step ST4 of FIG. 4, as mentioned above, the test data is to be returned as it is from the first optical communication apparatus 20. However, when the optical signal 210 is not returned within a certain time period, there is a case in which the optical signal 210 cannot normally be received by the light receiving element 6. The reason of such an example is, for example, that optical path lengths of the optical fibers F1 and F2 are longer than predicted optical path lengths, that the optical characteristic of the first optical communication apparatus 20 differs from a predicted characteristic, that the first optical communication apparatus 20 is failed or the like.

Hence, the power control circuit unit 2 can transmit the light emitting power value control signal s2c of FIG. 2 to the driving circuit 3 by increasing the power value little by little as shown by power values P1, P2, P3, P4 and P5 of the optical signal 200 in FIGS. 5A, 5B, 5C, 5D and 5E. That is, the power control circuit unit 2 can specify an optimum power value of the optical signal 200 for optical communication in the communication system 100 comprising the first optical communication apparatus 20 as well as the second optical communication apparatus 21 and the optical fibers F1 and F2 shown by FIG. 1 by transmitting the light emitting power value control signal s2c having the light emitting power values as shown by FIGS. 5A, 5B, 5C, 5D and 5E. The optimum power value of the optical signal is a value capable of performing optical transmission by making transmission loss in optical transmission as small as possible without supplying excessive light to the system.

At step ST4 of FIG. 4, in the case where, for example, the test signal input s2a of the transmitting unit 21A is given, the optical signal 200 is emitted to the optical fiber F1 and the optical signal 210 cannot be received on the side of the receiving unit 21B, the power control circuit unit 2 regards it as a deficiency in the power value of the optical signal 200 and supplies the light emitting power value control signal s2c for increasing the power value as shown by FIGS. 5A, 5B, 5C, 5D and 5E. In FIGS. 5A, 5B, 5C, 5D and 5E, the power value of the optical signal is set respectively to P1, P2, P3, P4 and P5 which are gradually increased. In this way, in the case in which despite that the second optical communication apparatus 21 has transmitted the optical signal 200 to the first optical communication apparatus 20 on the other party side via the optical fiber F1, when it is prior to supplying the time out signal s18 to the control circuit 10 by the timer circuit 18 shown by FIG. 3 as instep ST5 of FIG. 4 (within a predetermined time period), in respect of the optical signal 210 received by the light receiving element 6, the power control circuit 2 carries out processing of setting a successive power value of the optical signal (step ST7) by which the light emitting power value control signal s2c is controlled in a direction of increasing the light emitting power as shown by FIGS. 5A, 5B, 5C, 5D and 5E.

Further, data in correspondence with the light emitting power value control signal s2c for the optical signal as shown by FIGS. 5A, 5B, 5C, 5D and 5E, is formed such that, for example, the control circuit 10 of the power control circuit unit 2 issues a count up instruction to the count circuit 12, the DAC circuit 12A digital/analog-converts the output s12 of the count circuit 12 and supplies it to the driving circuit 3.

Further, as shown by step ST8 of FIG. 4, a limit is provided to the power value of the optical signal 200 on the transmitting side. The monitor light receiving element 5 of FIG. 2 monitors the optical signal 200 and the power control circuit unit 2 prevents the light emitting element 4 from emitting light more than necessary. The power control circuit unit 2 prevents the light emitting element 4 from emitting light more than necessary in manner since when the light emitting element 4 emits light at a high power value, the life of the light emitting element 4 is shortened and the light emitting element 4 outputs an optical signal having a power value which is excessive in optical communication. When the power value of the optical signal 200 exceeds a certain limit value, the power control circuit unit 2 of FIG. 2 transmits the alarm signal sA1 to the control circuit 115. Thereby, the control circuit 115 can inform the user of the alarm by displaying the alarm in the display unit 115A or emitting alarm sound by using the alarm sound emitting unit 115B such as a speaker. This operation is shown by step ST6 of FIG. 4. Further, when the timer circuit 18 of FIG. 3 outputs the time out signal s18 to the control circuit 10 (time out), the control circuit 15 similarly issues alarm as in step ST6.

The selector 17 selects by the selecting signal s10a, which one of the test pattern signal s16a formed by the test pattern generating circuit 16 of the second optical communication apparatus 21 and the test pattern signal from the opposed first optical communication apparatus 20, is to be transmitted as the test pattern. For example, when the test pattern from the other party side is received, the control circuit 10 outputs the select signal s10a for selecting the test pattern from the other party side.

According to the above-described embodiment, there is shown an example of controlling the light emitting power value of the optical signal 100 on the transmitting side. The present invention is not limited thereto but the light reception sensitivity of the light receiving element 6 may be controlled in addition to the control of the light emitting power value of the optical signal 200 from the light emitting element 4 as shown by FIG. 6 and FIG. 7.

In this case, the power control circuit unit 2 supplies a reception sensitivity control signal r2c to the amplifying circuit 7 of the light receiving element 6 and can change a rate of amplifying the optical signal 210 based on the reception sensitivity control signal r2c. By increasing the amplification rate of the amplifying circuit 7 to a degree at which the amplifying circuit 7 is not saturated, a higher optical reception sensitivity can be provided without increasing the power value of the light emitting element 4 by which transmission can be carried out by a smaller light emitting power value.

Figure 6:
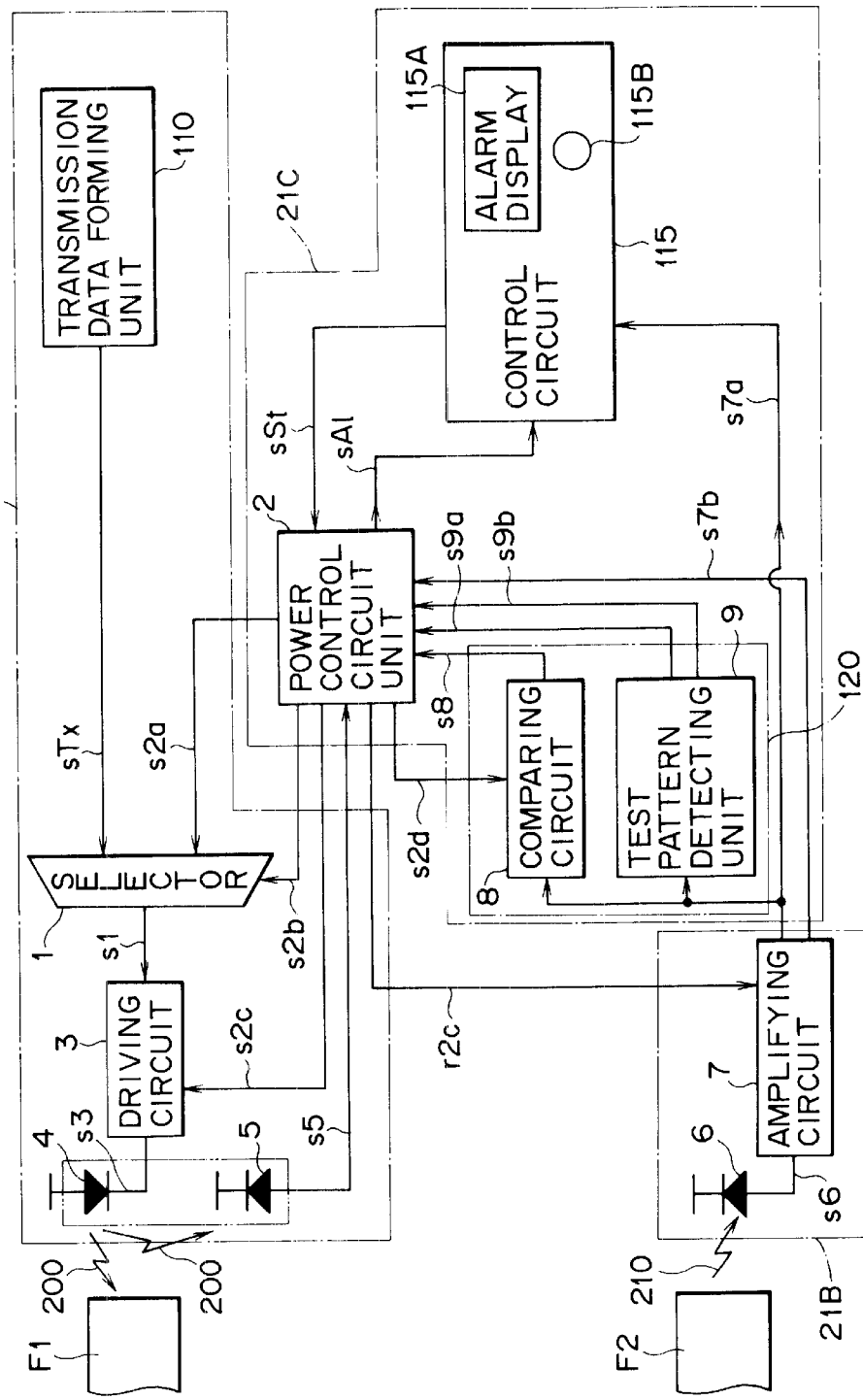
FIG. 6 is a diagram showing other preferred embodiment of an optical communication apparatus of a communication system according to the present invention.

Or in FIG. 6, the power control circuit unit 2 may control only the reception sensitivity control signal r2c without controlling the light emitting power value control signal s2c.

Figure 7:
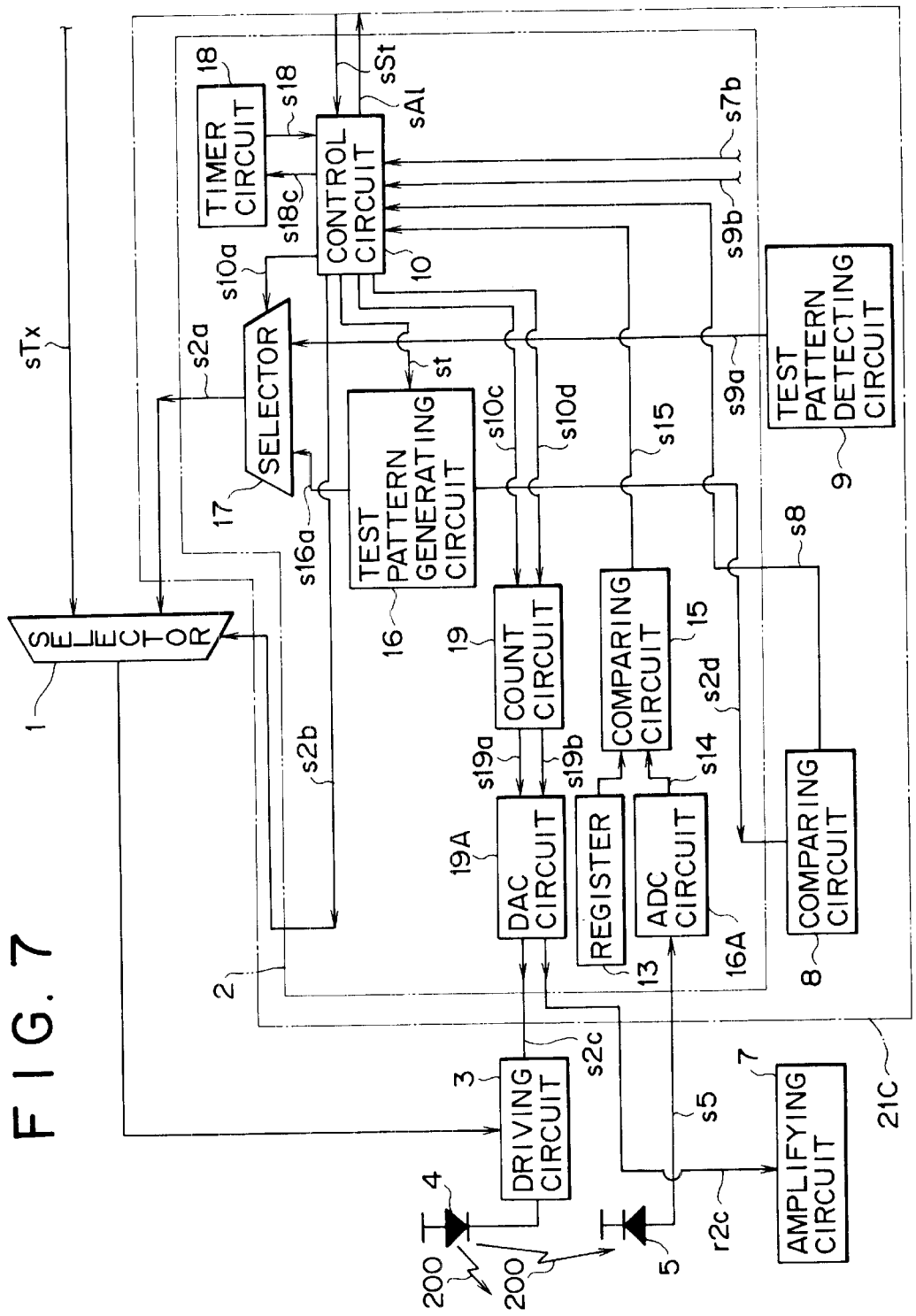
FIG. 7 is a diagram showing an example of the structure of a power control circuit unit of the optical communication apparatus shown by FIG. 6.
Figure 8:
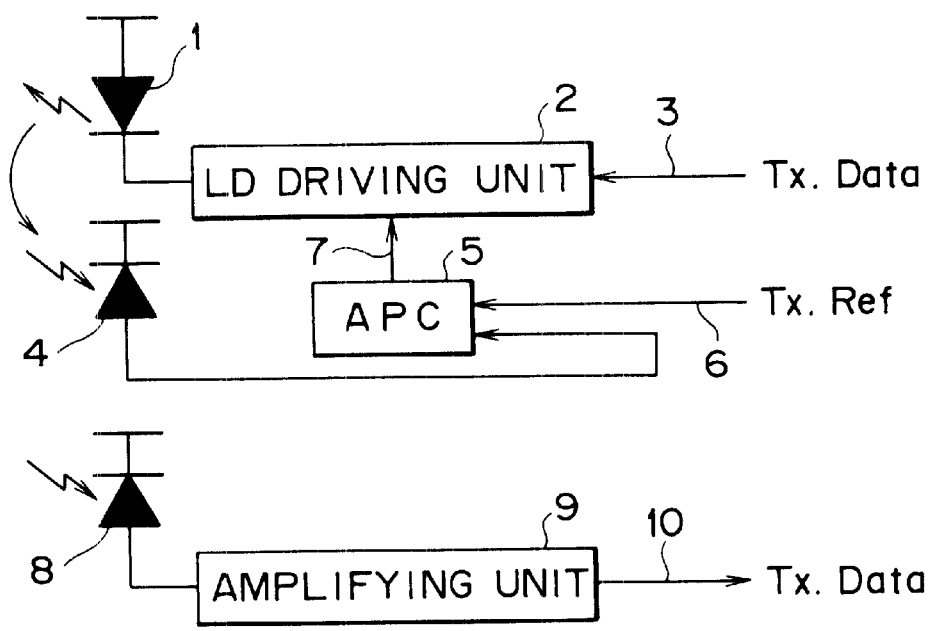
FIG. 8 is a diagram showing an example of a conventional optical communication apparatus.

FIG. 7 shows a detailed constitution of the power control circuit unit 2 shown by FIG. 6 and its peripheral portions. Blocks having constitutions and operations the same as those in the blocks of FIG. 3 are attached with the same notations.

In FIG. 7, a count circuit 19 and a DAC circuit (digital/analog conversion circuit) 19A are respectively provided with two routes of inputs and outputs for controlling the driving circuit 3 and the amplifying circuit 7.

The control circuit 10 supplies a driving circuit power up signal s10c to the count circuit 19. The count circuit 19 counts the driving circuit power up signal s10c and transmits a count value to the DAC circuit (digital/analog conversion circuit) 19A as a driving circuit count output s19a. The DAC circuit 19A converts the driving circuit counter output s19a into an analog signal and transmits the power control signal s2c of the driving circuit to the driving circuit 3. The driving circuit 3 can control the power value of the optical signal 200 of the light emitting element 4 based on the power control signal s2c.

Further, the control circuit 10 supplies an amplifying circuit gain up signal s10d to the count circuit 19. The count circuit 19 counts the amplifying circuit gain up signal s10d and transmits a count value to the DAC circuit (digital/analog conversion circuit) 19A as an amplifying circuit count output s19b. The DAC circuit 19A converts the amplifying circuit count output s19b into an analog signal and transmits the reception sensitivity control signal r2c of the amplifying circuit to the amplifying circuit 7. The amplifying circuit 7 can control the reception sensitivity of the optical signal 210 of the light receiving element 6 based on the reception sensitivity control signal r2c.

Further, a current set value of the optical communication apparatus may be transmitted along with the test signal input s2a for using in control. That is, a current light emitting power value may be included in the test pattern and may be transmitted along therewith and set the light emitting power of the opposed optical communication apparatus. In this case, for example, conditions of setting both of the optical communication apparatus 20 and 21 can be matched.

According to the embodiment of the present invention, the light emitting element 4 can be operated by a light emitting power value which is optimum in the communication system in accordance with kinds, lengths, a situation of laying them and a situation of using them of the connected optical fibers and accordingly, long life of the light emitting element can be expected.

The light emitting power of the light emitting element 4 and the light reception sensitivity of the light receiving element 6 can be controlled dynamically in accordance with conditions and accordingly, by using only one kind of the light emitting elements or the light receiving elements, transmission distances of the optical fibers F1 and F2 or the kind of the optical fibers can be dealt with.

Almost all of the functions can be realized by digital circuits as shown by FIG. 2 or FIG. 3 and cost reduction can be achieved by incorporating them in an LSI (large scale integrated circuit).

A system of digital control is adopted in the power control circuit unit 2 of the optical communication apparatus shown by FIG. 2 and FIG. 3, the register 13 shown by FIG. 3 can maintain a plurality of stages of power values of an optical signal for monitoring which are set data and accordingly, burst transmission is easily dealt with. That is, immediate transmission is feasible with a maintained power value when the transmission is intended. When burst transmission is going to carry out in analog, an optical communication apparatus needs to take a sufficient stabilizing time period such that a predicted test pattern can be transmitted. In contrast thereto, according to a digital system, a predicted pattern can be outputted immediately.

The present invention has been explained by one preferable embodiment of the optical communication apparatus using two optical fibers. However, the present invention can also be applied to the optical communication apparatus using one optical fiber.

As has been explained, according to the present invention, there can firmly be carried out optical communication using optical transmission media among optical communication apparatus under an optimum condition.

What is claimed is:

1. An optical communication apparatus connected to an optical communication apparatus on other party side via an optical transmission medium for communicating a data signal with the optical communication apparatus on the other party side, said optical communication apparatus comprising:

drive signal outputting means for controlling a signal level of an input signal in accordance with a light emitting power control signal and outputting the input signal the signal level of which has been controlled as a drive signal;

a light emitting element for emitting light at an intensity in accordance with the signal level of the drive signal and transmitting an optical signal via the optical transmission medium;

test signal generating means for forming a test signal having a specific signal pattern;

selecting means for selectively outputting either of the test signal and the data signal to the drive signal forming means as the input signal;

a light receiving element for receiving the optical signal via the optical transmission medium and converting the received optical signal into an electric signal;

detecting means for detecting whether the electric signal outputted from the light receiving element coincides with the specific signal pattern when the selecting means selects the test signal; and controlling means for controlling a parameter of the light emitting power control signal based on a result of detection by the detecting means;

wherein when the detecting means detects that the electric signal does not coincide with the specific signal pattern, the controlling means controls the parameter of the light emitting power control signal such that an intensity of the optical signal outputted by the light emitting element is increased and when the detecting means detects that the electric signal coincides with the specific signal pattern, the controlling means sets a current value of the parameter of the light emitting power control signal as the parameter when the selecting means selects the data signal.

2. The optical communication apparatus according to claim 1:
   wherein the specific signal pattern of the test signal formed by the test signal generating means is previously set to be different from a signal pattern of a test signal outputted from the optical communication apparatus on the other party side:
   wherein the selecting means comprising:
      a first selector for selectively outputting either of the test signal formed by the test signal generating means and the electric signal outputted from the light receiving element; and
      a second selector for selectively outputting either of an output from the first selector and the data signal;
      wherein the controlling means controls the selecting means such that when the test signal having the signal pattern different from the specific signal pattern is detected, the first selector outputs the electric signal and the second selector outputs the electric signal which is the output from the first selector.

3. The optical communication apparatus according to claim 1, further comprising:
   an intensity detecting light receiving element for detecting the intensity of the optical signal transmitted from the light emitting element;
   wherein the controlling means stops controlling the parameter which is carried out when the detecting means detects that the electric signal does not coincide with the specific signal pattern in a case in which the intensity of the optical signal detected by the intensity detecting light receiving element becomes a limit value or more.

4. The optical communication apparatus according to claim 3, further comprising:
   storing means for storing the limit value of the light emitting element for emitting light;
   wherein the controlling means stop controlling the parameter when the intensity of the optical signal detected by the intensity detecting light receiving element is equal to the limit value.

5. The optical communication apparatus according to claim 1:
   wherein the controlling means controls the selecting means such that the data signal is outputted after the parameter of the light emitting power control signal has been set.

6. The optical communication apparatus according to claim 1, further comprising:
   time measuring means for measuring a time period from a timing when the light emitting element transmits the test signal.

7. The optical communication apparatus according to claim 6, further comprising:
   informing means for informing an abnormality to a user based on a signal indicating the abnormality outputted by the controlling means;
   wherein the informing means informs a user of the abnormality by outputting the signal indicating the abnormality when the controlling means has not set the parameter of the light emitting power control signal until the time measuring means has counted the predetermined time period from the timing when the light emitting element transmitted the test signal.

8. The optical communication apparatus according to claim 1, further comprising:
   amplifying means connected between the light receiving element and the detecting means for amplifying the electric signal converted by the light receiving element based on a predetermined gain and outputting the amplified electric signal to the detecting means.

9. The optical communication apparatus according to claim 8:
   wherein the amplifying means comprises an analog/digital converting unit for analog/digital-converting the electric signal.

10. The optical communication apparatus according to claim 8:
    wherein the controlling means controls the gain based on the result of detection of the detecting means.

11. The optical communication apparatus according to claim 1:
    wherein the test signal is a signal having a specific rule which is not provided to the data signal.

* * * * *